United States Patent
Takeshima

(10) Patent No.: US 7,216,912 B2
(45) Date of Patent: May 15, 2007

(54) STRUCTURE OF STORAGE SECTION FOR SADDLE-RIDDEN TYPE VEHICLE

(75) Inventor: Masao Takeshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/815,755

(22) Filed: Apr. 2, 2004

(65) Prior Publication Data

US 2004/0195855 A1    Oct. 7, 2004

(30) Foreign Application Priority Data

Apr. 4, 2003  (JP)  ............................. 2003-102129
Mar. 8, 2004  (JP)  ............................. 2004-064196

(51) Int. Cl.
*B60R 7/00*   (2006.01)

(52) U.S. Cl. ..................... 296/37.1; 224/544

(58) Field of Classification Search .............. 296/24.3, 296/37.1, 97.22, 37.2, 1.04, 1.07, 37.8, 70, 296/72, 73, 37.12, 37.13; 224/400, 401, 224/408, 412, 539, 544

See application file for complete search history.

(56) References Cited

U.S. PATENT DOCUMENTS

| | | | | |
|---|---|---|---|---|
| 4,441,574 A | * | 4/1984 | Kohyama et al. | 180/219 |
| 4,619,476 A | * | 10/1986 | Kawasaki | 296/37.1 |
| 5,303,795 A | * | 4/1994 | Buell | 180/219 |
| 5,593,330 A | * | 1/1997 | Kobayashi | 440/84 |
| 6,062,623 A | * | 5/2000 | Lemmen | 296/37.8 |
| 6,152,512 A | * | 11/2000 | Brown et al. | 296/37.12 |
| 6,428,076 B2 | * | 8/2002 | Sumada et al. | 296/37.1 |
| 6,533,339 B1 | * | 3/2003 | Bettin et al. | 296/37.1 |
| 6,705,680 B2 | * | 3/2004 | Bombardier | 298/17 R |
| 6,719,346 B2 | * | 4/2004 | Bettin et al. | 296/37.1 |
| 6,793,270 B2 | * | 9/2004 | van der Vegt et al. | 296/156 |
| 2003/0111859 A1 | * | 6/2003 | Bettin et al. | 296/37.1 |
| 2004/0026949 A1 | * | 2/2004 | Lin | 296/37.1 |

FOREIGN PATENT DOCUMENTS

JP    60-158984 U    10/1985
JP    1-39671 Y2    11/1989

* cited by examiner

*Primary Examiner*—Jason Morrow
(74) *Attorney, Agent, or Firm*—Birch, Stewart, Kolasch & Birch, LLP

(57) ABSTRACT

A storage section structure of a saddle-ridden type vehicle for ensuring adequate storage capacity and allowing the storage workability to be increased while making it possible to improve the external appearance. A storage indent is indented downwardly and is provided on an inclined plane portion of a fender that covers a wheel. A lid is provided that opens and closes an opening of the storage indent. The lid is also swingably provided on the inclined plane portion of the fender. In this way, it is possible to prevent the projection of the structure from the outer surface of the fender while making it possible to widen the storage space above the fender and widen the opening section.

43 Claims, 15 Drawing Sheets

STRUCTURE OF STORAGE SECTION FOR SADDLE-RIDDEN TYPE VEHICLE

BACKGROUND OF THE INVENTION

CROSS-REFERENCE TO RELATED APPLICATIONS

The present application claims priority under 35 USC 119 to Japanese Patent Application Nos. 2003-102129 filed on Apr. 4, 2003 and 2004-064196 filed on Mar. 8, 2004 the entire contents thereof is hereby incorporated by reference.

1. Field of the Invention

The present invention relates to a structure of a storage section for a saddle-ridden type vehicle.

2. Description of Background Art

With respect to a storage structure for a saddle ridden type vehicle, a box-type storage unit is attached to an outer surface of a fender by using bolts. See, for example, Japanese Utility Model laid-open No. Sho. 60-158984.

The disclosure of Japanese Utility Model laid-open No. Sho. 60-158984 includes a box-type storage unit attached to an outer surface of a fender so that the storage unit sticks out from the outer surface of the fender. This arrangement does not provide a good external appearance. Also, if the extent of sticking out is reduced so that the storage unit is inconspicuous, the storage space is made narrow and it is not possible to ensure adequate storage capacity. Further, if the extent of sticking out is reduced, and the opening section is narrowed in the attachment direction, and it is difficult to remove items from the storage space.

SUMMARY AND OBJECTS OF THE INVENTION

Therefore, it is an object of the present invention to provide a storage section structure of a saddle-ridden type vehicle that makes it possible to ensure adequate storage capacity and allows the storage workability to be increased, while making it possible to improve the external appearance.

To attain the above-mentioned objective, the present invention provides a storage indent 35 that is indented downwardly and is formed on an inclined plane portion 33 of a fender portion 31 that covers a wheel, for example a left front wheel 12 (12a). A lid is provided that opens and closes 70 an opening 41 of the storage indent that is swingably provided on the inclined plane portion of the fender.

The present invention provides a storage indent that is integrally molded with the fender.

The present invention provides a peripheral indent 44 that is shallower than the storage indent. The peripheral indent 44 is formed throughout the entire periphery at the periphery of the storage indent with a sealing member 89 installed on the rear surface of the lid, which makes contact with the peripheral indent throughout the entire periphery in the closed state.

The present invention provides a dividing wall portion 49 that protrudes on the upper side that is formed along the entire periphery of the border edge on the storage indent side of the peripheral indent.

According to the present invention a storage indent body 118 that includes the storage indent is separate from the fender, with the storage indent body being provided on the fender and being provided with a support section for pivoting the lid.

The present invention provides a coupling arm portion 75, 76 that extends out from the rear surface of the lid passes through a penetrating hole 50, 51 formed at a lower part of the peripheral indent, and is rotatably coupled to a swinging movement support portion 58, 59 on the rear surface of the fender.

The present invention provides a spring, for example a rotating bias spring 91, that biases the lid in the open direction that is installed on the swinging movement support portion.

According to the present invention, a structure of a storage section for a saddle-ridden type vehicle is provided with a storage indent that is indented downwards on an inclined plane portion of a fender. Since a lid that opens and closes an opening of this storage indent is also swingably provided, it is possible to prevent storage section from projecting out from the outer surface of the fender. It is therefore possible to improve the external appearance. Also, since the storage indent that is indented downwardly is provided on an inclined plane part of the fender, as well as preventing sticking out, it is also possible to widen the storage space and widen the opening section. Therefore, it is possible to ensure adequate storage capacity and storage workability can be improved. Further, due to the fact that the storage indent is indented downwardly and is provided on the inclined plane portion of the fender, even if the lid for opening and closing the opening of the storage indent is made to open wide in order to improve storage workability, an object being stored does not drop from the storage indent. Therefore, storage workability can be improved without storage objects being dropped. Furthermore, since the open area of the aperture becomes larger than the horizontal cross section of the storage indent due to the fact that the storage indent is formed on the inclined plane portion, storage workability can be further improved.

According to the present invention, since the storage indent is integrally molded within the fender an increase in cost can be reduced at the same time as increase in the number of parts can be reduced.

According to the present invention, a peripheral indent is formed throughout the entire periphery of the storage indent that is shallower than the storage indent. Thus, a lid in the closed state can be fitted into this peripheral indent, making it possible for the fender and the lid in the closed state to form one single surface. Therefore, the external appearance is improved. In addition, since the sealing member installed on the rear surface makes contact with the peripheral indent throughout the entire periphery when the lid is in the closed state, rainwater and the like can be prevented from entering into the interior of the storage indent. Therefore, waterproofing of the storage indent can be ensured. Furthermore, since it is possible to bias the lid in the open direction when in the closed state, with the seal member, it is possible to restrict rattling due to play of the lid in the closed state. Therefore, it is possible to prevent abnormal noises from occurring due to rattling of the lid during operation.

According to the present invention, since a dividing wall portion protrudes on the upper side along the entire periphery of the border edge on the storage indent side of the peripheral indent, it is possible, by the dividing wall portion, to ensure that rainwater and the like are prevented from entering the interior of the storage indent. Therefore, waterproofing of the storage indent can be ensured. In addition, since if the sealing member of the lid in the closed state is brought in contact with this dividing wall portion, the sealing member can be widely deformed, making it possible to strongly bias the lid in the open direction when in the closed state. In addition, by using the seal member, it is possible to restrict rattling due to play of the lid in the closed state. Therefore, it is possible to prevent abnormal noises from occurring due to rattling of the lid during operation.

According to the present invention, since a support section for pivoting the lid is provided in the storage indent formed separately from the fender, it is possible to make the structure compact compared to the case where the lid is pivoted at the fender side. It is also easy to take out the position of the storage indent and the support section.

According to the present invention, in the event where a structure is adopted in order to permit a wide opening for the storage indent by providing a wide swinging of the lid with a coupling arm portion of the lid being supported by a swinging movement support portion on the rear surface of the fender through a penetrating hole formed in a peripheral indent more on the outside than the storage indent with the penetrating hole being formed at a lower part of the peripheral indent, rainwater that infiltrates into the peripheral indent can be guided with the peripheral indent on the outside of the sealing member and eliminated satisfactorily through the penetrating hole. Therefore, pooling of rainwater in the peripheral indent can be prevented.

According to the present invention, since the lid in the closed state is biased in the open direction with the biasing force of the spring from the swinging movement support portion in addition to the biasing force of the sealing member installed on the rear surface of the lid, it is possible to ensure that rattling due to play of the lid in the closed state is restricted. Therefore, it is possible to prevent abnormal noises from occurring due to rattling of the lid during operation of the vehicle. Furthermore, since the opening operation of the lid is helped by the biasing force of the rotating bias spring, a smooth opening operation is possible.

According to the present invention, since the storage indent is installed on the fender of the left front wheel, for instance when parked, the occupant in the saddled state while maintaining the right hand brake lever in the held state can open and close the lid satisfactorily with only the left hand, to insert and remove an article from storage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A first embodiment of a storage section structure of a saddle-ridden type vehicle of the present invention will be described below with reference to FIG. 1 to FIG. 6. In addition, front, back, left and right in the description below are front, back, left and right in the direction of progression when the vehicle advances.

Figure 1:
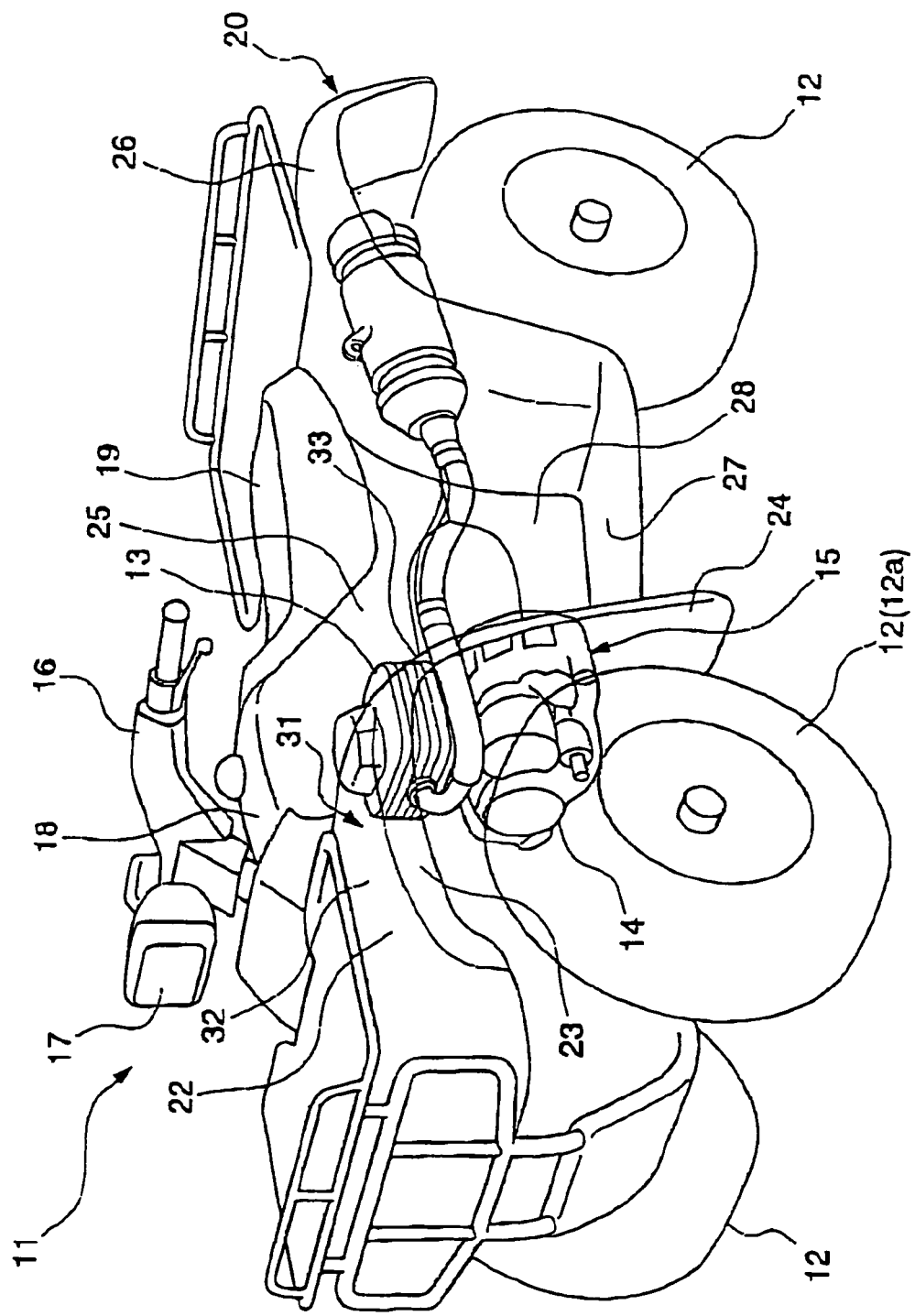
FIG. 1 is a perspective view showing a saddle-ridden type vehicle to which the storage section structure of a saddle-ridden type vehicle according to a first embodiment of the present invention has been applied.

FIG. 1 is a perspective view showing a saddle-ridden type vehicle suitable for driving on uneven terrain as the main purpose, a so-called buggy vehicle.

The saddle-ridden type vehicle 11 has wheels 12 placed at the front, back, left and right 4 corners of the vehicle body with a power unit 15 having an engine 13 and a transmission 14 mounted at an approximately center position of the vehicle body. A handle bar 16 is provided for input of steering for the front wheels 12. The handle bar 16 is installed so as to extend in the left-right direction over the front upper portion of the vehicle body. A headlight unit 17 is supported by the handle bar 16. A fuel tank 18 is installed at the back of the handle bar 16 with a seat 19 installed at the back of the fuel tank 18. A resin-molded vehicle body cover 20 is provided for the vehicle 11. In addition, this saddle-ridden type vehicle 11 is meant to be of a so-called transverse type, wherein a crankshaft, not shown, extends from the engine 13 in the front to rear direction.

The vehicle body cover 20 has a front cover 22 that covers the front portion of the vehicle body containing the front wheels 12 with a front mud guard 23 that is installed on both left and right sides of the front cover 22 for covering the side portions of the front cover 22 together with the upper portions of the front wheels. Left and right sub-fenders 24 are installed at the back of the front cover 22 and the front mud guard 23 for covering the back portion of the front wheels 12. A center cover 25 is present at the back of the front cover 22 for covering the fuel tank 18 over the left and right side portions of the vehicle body. A rear cover 26 is provided at the back of the center cover 25 for covering the back portion of the vehicle body. Left and right center mud guards 27 are installed at the back of the sub-fenders 24 for covering the side portions of the vehicle body with left and right engine sub-covers 28 that are installed between the back end side of the center cover 25 and the center mud guard 27 for covering the side portions of the vehicle body.

The storage section structure of the present invention is applied on a left front fender portion 31 of the front cover 22 that covers the left front wheel 12 (12a).

Figure 2:
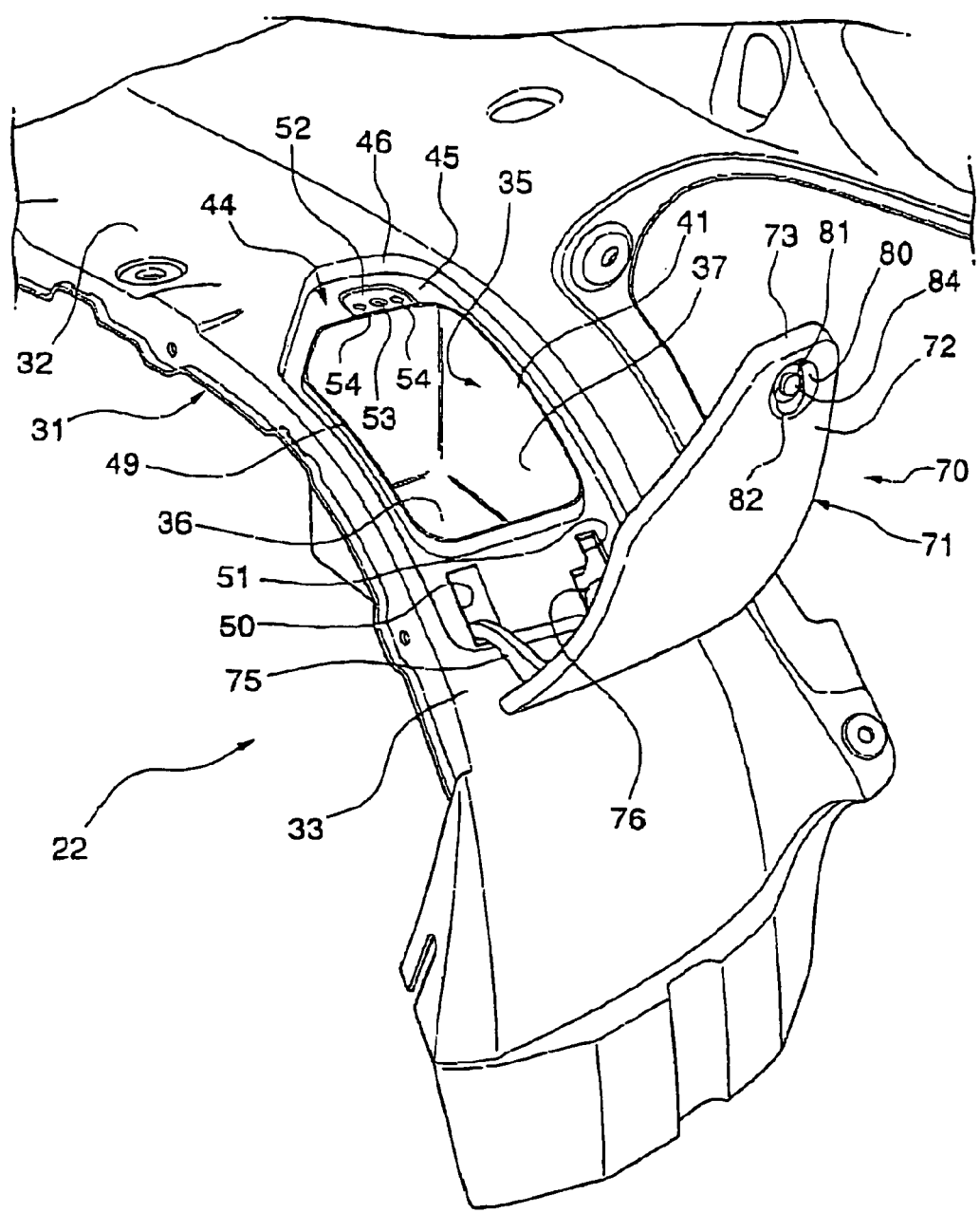
FIG. 2 is a perspective view of the storage section structure of a saddle-ridden type vehicle according to the first embodiment of the present invention, viewed from the upper side and rear side of the left side of the vehicle body, showing the open state of the lid.

The left front fender portion 31 has an upper face portion 32 that covers the upper portion of the left front wheel 12 (12a) approximately horizontally, and an inclined plane portion 33 that is installed on the rear side of this upper face portion 32 and is inclined with respect to the horizontal in such a way that while being curved along the back upper part of the left front wheel 12 (12a) it is positioned lower down towards the rear side. A vertical storage indent 35 is indented downwardly and is integrally molded in this inclined plane portion 33, as shown in FIG. 2. At the time of molding the front cover 22 is made of resin and includes the left front fender portion 31.

Figure 3:
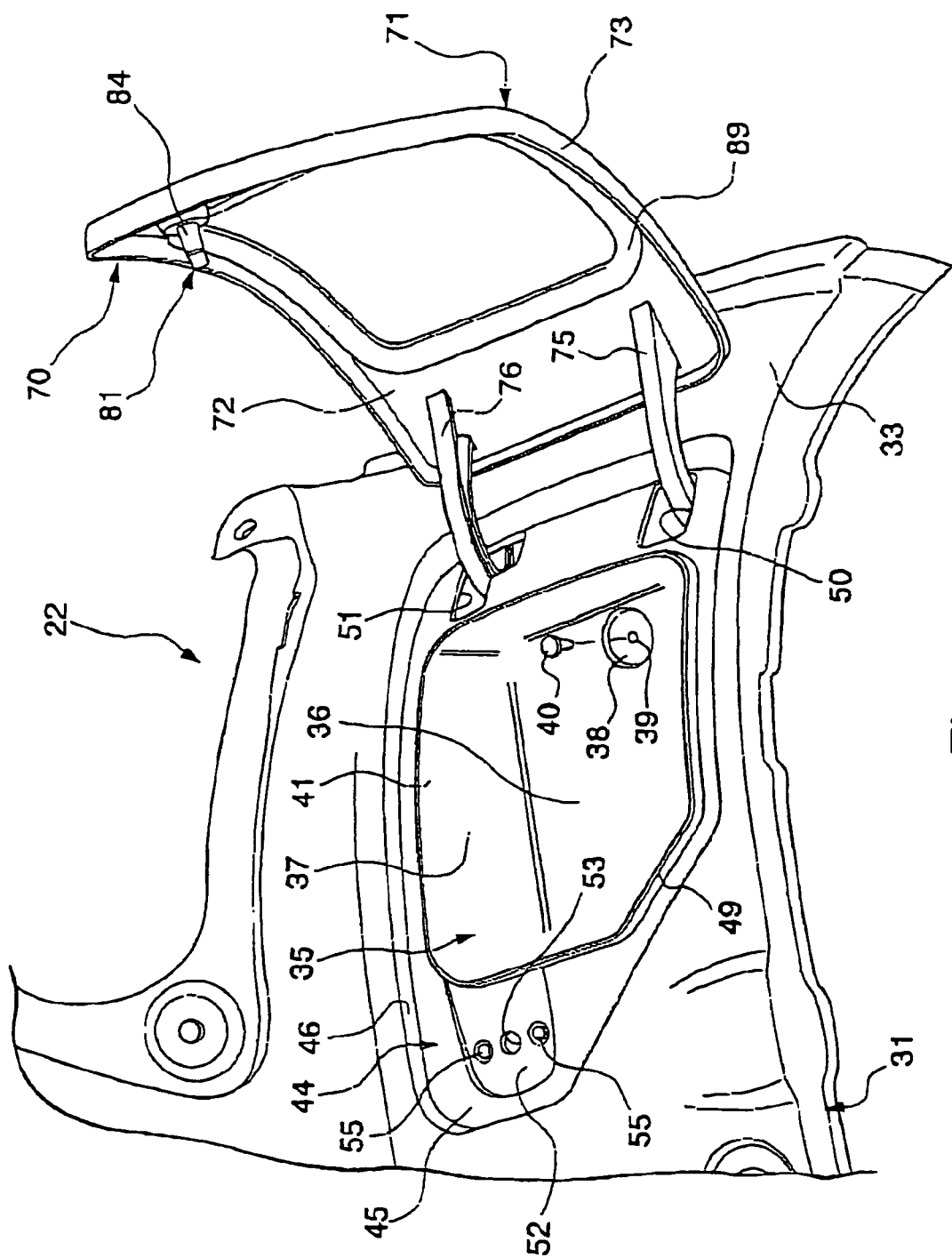
FIG. 3 is a perspective-view of the storage section structure of a saddle-ridden type vehicle according to the first embodiment of the present invention viewed from the upper side and substantially front side of the left side of the vehicle body, showing the open state of the lid.

The storage indent 35 has a bottom surface portion 36 that is inclined so that the back portion is located slightly on the lower side with respect to the horizontal, and adopts an approximately rectangular shape, which is elongated in the front-back direction and has a chamfer formed on the left side front portion. A side wall portion 37 is formed, projecting upwardly from the entire periphery of the peripheral edge portion of the bottom surface portion 36 in the vertical direction. In addition, as shown in FIG. 3, at the back portion of the bottom surface portion 36, a water drain indent 38 is formed that is indented downwardly with a penetrating hole 39 being formed that passes through vertically at the bottom portion of this water drain indent 39. The penetrating hole 39 is closed by a detachable plug member 40. This water drain indent 38 and plug member 40 are installed so as to drainwater through the penetrating hole 39 by taking out the plug member 40, for instance when washing the storage indent 35.

At the periphery of aperture 41 on the upper part of the storage indent 35, a peripheral indent 44 is formed that is indented downwardly to an extent that is shallower than the storage indent 35 while being curved from the inclined plane portion 33 of the left front fender portion 31 for matching the curve of the inclined plane portion 33 throughout the entire periphery. That is to say, two stages of indents 35, 44 are formed. The peripheral indent 44 also includes a bottom surface portion 45 wherein the shape of its planar view is approximately rectangular, which is elongated in the front-back direction and in which a chamfer is formed on the left side front portion similarly to the storage indent 35. In addition, a side wall portion 46 is formed, projecting upwardly from the entire periphery of the peripheral edge portion of the bottom surface portion 45 in the vertical direction. The side wall portion 46 is connected to the inclined plane portion 33 of the left front fender portion 31. A dividing wall portion 49 protrudes upwardly and is formed along the entire periphery of the border edge on the storage indent 35 side of this peripheral indent 44. The dividing wall portion 49 is formed continuously with the side wall portion 37 on the upper side of the side wall portion 37 of the storage indent 35 and protrudes in a range that is on a lower side than the inclined plane portion 33 of the left front fender portion 31.

Penetrating holes 50, 51 are formed in the vertical direction at two locations on the left and right in the back portion of the peripheral indent 44, that is, at the lower position. More specifically, the left side penetrating hole 50 adopts a square long hole shape, which is elongated in the front-back direction. On the other hand, the right side penetrating hole 51 adopts a shape that extends partially from the lower part of a similar long hole in the direction of the penetrating hole 50.

Figure 4:
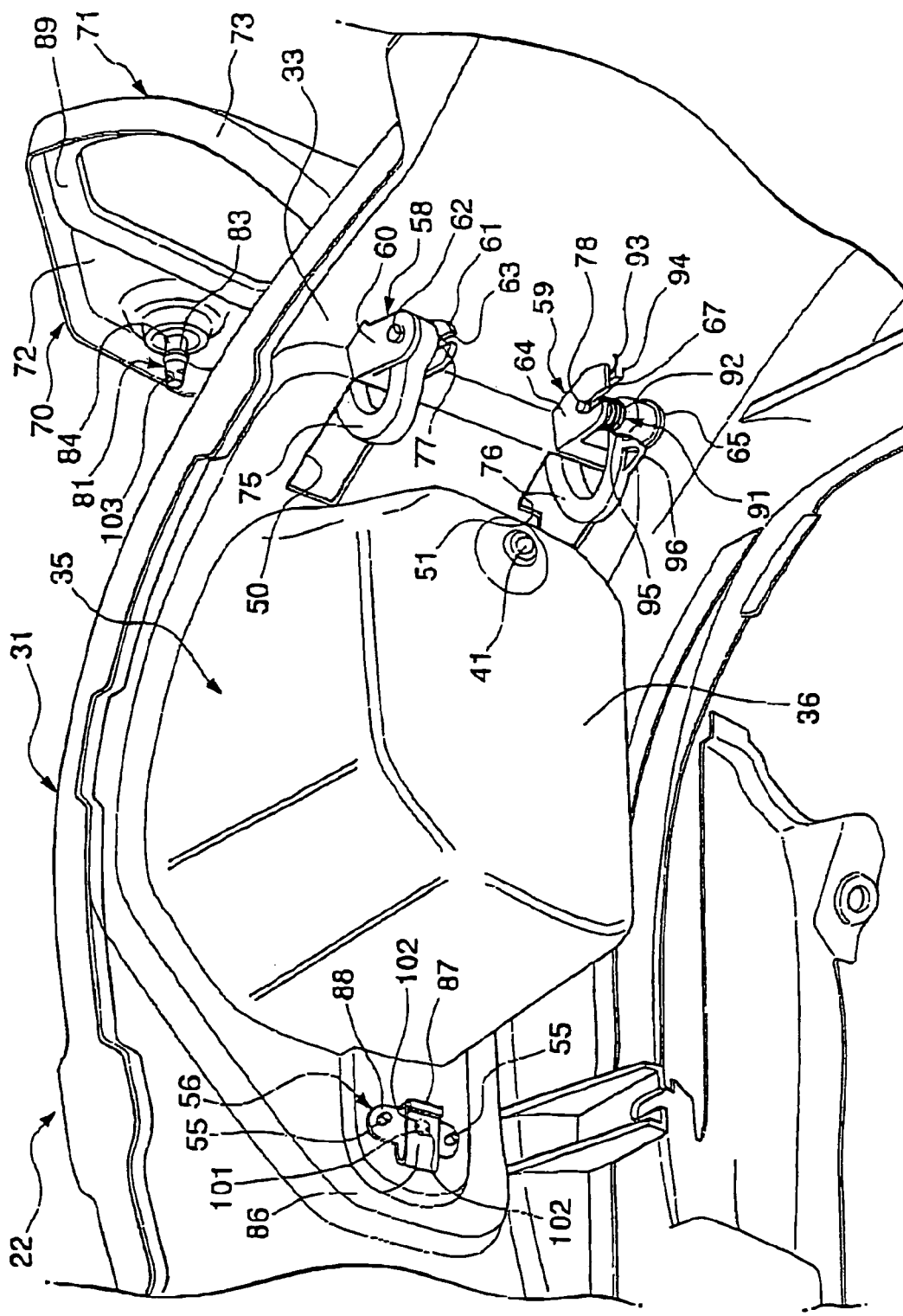
FIG. 4 is a perspective view of the storage section structure of a saddle-ridden type vehicle according to one embodiment of the present invention, viewed from lower side and substantially front side of the left side of the vehicle body, showing the open state of the lid.

In addition, at the side of the peripheral indent 44 that is more to the front than the storage indent 35, an escape indent 52 is formed that is indented downwardly slightly more than the peripheral indent 44. On the bottom portion of this escape indent 52, an insertion hole 53 and mounting holes 54 on both of its sides are punched in the vertical direction, as shown in FIG. 2. On the rear side of the escape indent 52 a catch holding portion 56 as shown in FIG. 4 is affixed by screws 55 as shown in FIG. 3. The screws are inserted from the front side through the mounting holes 54. The peripheral indent 44 such as the one above is obviously also integrally molded at the time of molding the front cover 22.

On the rear surface of the inclined plane portion 33 of the left front fender portion 31, swinging movement support portions 58, 59 are formed, respectively, that are contiguous to the back of each penetrating hole 50, 51. On the one hand, the left side swinging movement support portion 58 has one pair of left and right support segment portions 60, 61 that extend outwardly and downwardly from the inclined plane portion. More specifically, a support hole 62 passes through in the left-right direction that is formed in the left side support segment portion 60. In addition, a support groove 63 has a shape that, at the same time as passing through in the left-right direction is also opened downwardly and is formed in the right side support segment portion 61. On the other hand, the right side swinging movement support portion 59 has one pair of left and right support segment portions 64, 65 that extend outwardly and downwardly from the inclined plane portion 33. More specifically, a support groove 67 has a shape that, at the same time as passing through in the left-right direction is also opened downwardly, is formed in the left side support segment portion 64. A support hole that passes through in the left-right direction, not shown, is formed in the right side support segment portion 65. The swinging movement support portions 58, 59 that are installed and spaced from the storage indent 35 are also integrally molded at the time of molding the front cover 22.

As shown in FIGS. 2 and 3, a lid 70 that opens and closes the aperture 41 on the upper part of the storage indent 35 is formed so as to be indented downwardly on the inclined plane portion 33 of the left front fender portion 31 and is swingably coupled to the left front fender portion 31. The lid 70 has a plate-shaped lid main body portion 71 that is curved in the same way as the peripheral indent 44 to close the storage indent 35 by fitting into the interior of the peripheral indent 44. The lid main body portion 71 adopts a shape that is one size smaller than the peripheral side wall portion 46 of the indent 44. That is to say, the lid main body portion 71 has an upper face portion 72 whose shape in planar view in the state where it is fitted into the peripheral indent 44 adopts an approximately rectangular shape, which is elongated in the front-back direction and in which a chamfer is formed in the left side front portion in the same way as the peripheral indent 44. In addition, a protrusion wall portion 73 is provided that protrudes slightly from the entire periphery of the peripheral edge portion of the upper face portion 72 towards the peripheral indent 44 side.

The lid 70 has one pair of left and right J-shaped coupling arm portions 75, 76 that extend out from the rear surface of the upper face portion 72, pass through the penetrating holes 50, 51 formed in the peripheral indent 44, and are rotatably coupled to the swinging movement support portion 58, 59 on the rear surface of the inclined plane portion 33. As shown in FIG. 4, the left side coupling arm portion 75 has an axial portion 77 that protrudes in the left-right direction at the protruding tip. The axial portion 77 is fitted to the support hole 62 and the support groove 63 of the left side swinging movement support portion 58. The right side coupling arm portion 76 also has an axial portion 78 that projects in the left-right direction at the projecting tip. The axial portion 78 is fitted to the support hole, not shown, and the support groove 67 of the right side swinging movement support portion 59.

Figure 5:
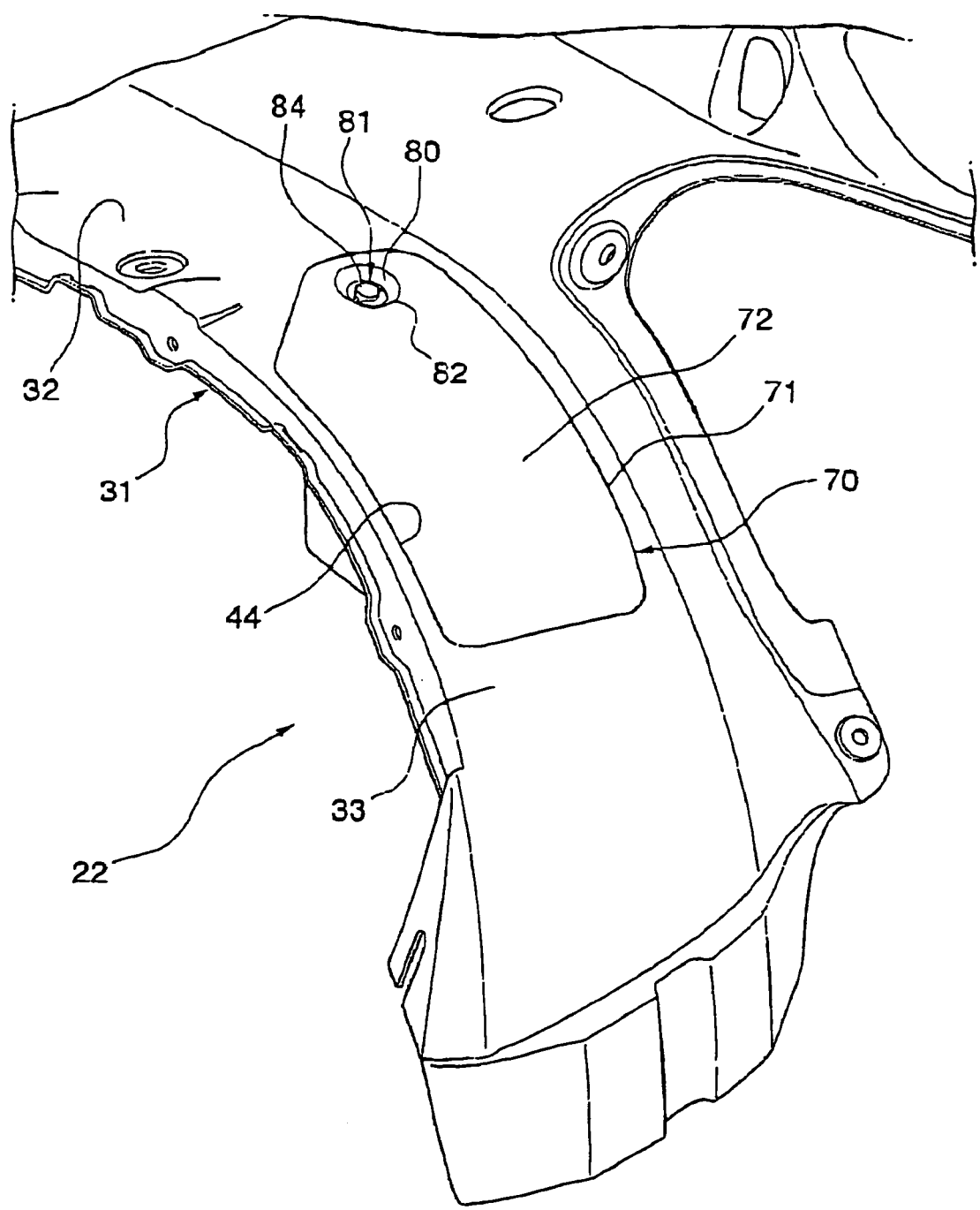
FIG. 5 is a perspective view of the storage section structure of a saddle-ridden type vehicle according to one embodiment of the present invention, viewed from the upper side and rear side of the left side of the vehicle body, showing the closed state of the lid.

The lid 70 supported by the left front fender portion 31 at the coupling arm portions 75, 76 as mentioned above is swung between the closed state as shown in FIG. 5, where the lid main body portion 71 is fitted into the interior of the peripheral indent 44 to close the storage indent 35 and the open state as shown in FIG. 2 to FIG. 4, where the lid main body portion 71 is rotated on the upper side to be opened so as to adopt an obtuse angle with respect to the aperture 41 of the storage indent 35 at a location spaced from the side that is more to the back than the storage indent 35. Here, in the above-mentioned closed state, the upper face portion 72 of the lid 70 and the inclined plane portion 33 of the left front fender portion 31 become one single surface. In addition, in the above-mentioned open state, the swing of the lid 70 in the open direction reaches a limit position, for instance, by the lid main body portion 71 coming into contact with the inclined plane portion 33 of the left front fender portion 31.

Figure 6:
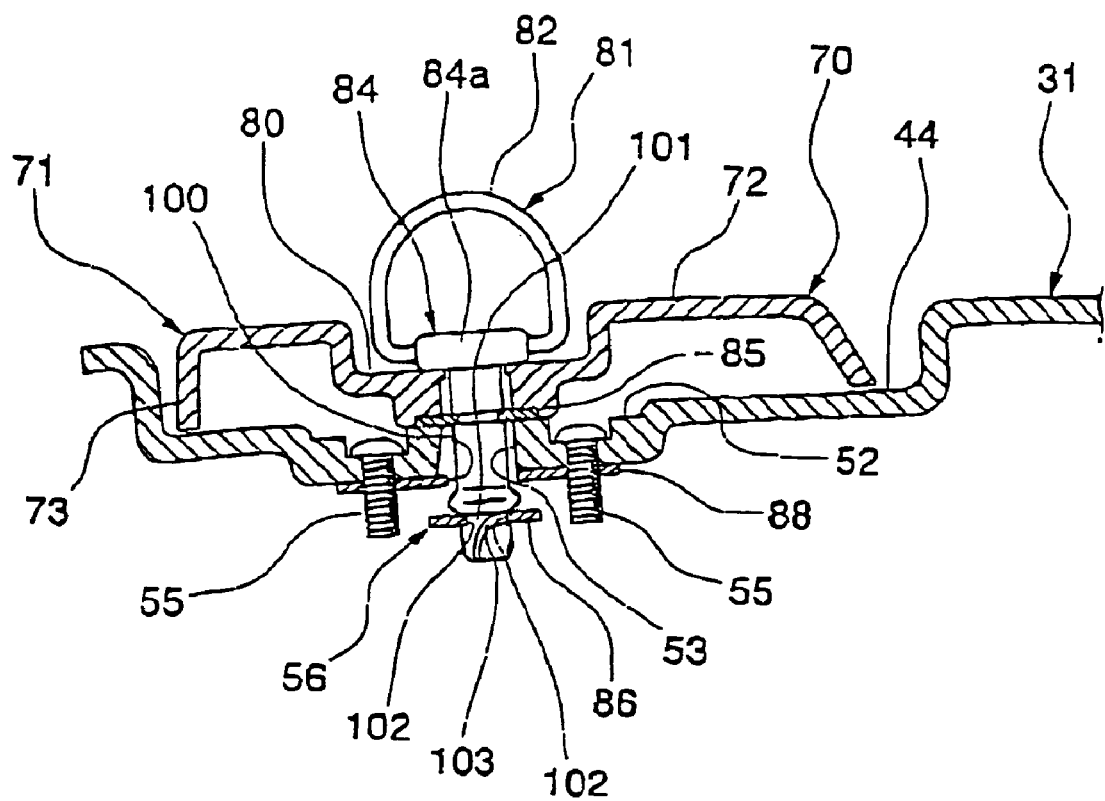
FIG. 6 is a cross-sectional view showing the locking mechanism of the lid of the storage section structure of a saddle-ridden type vehicle according to a first embodiment of the present invention.

An indent 80 that is indented in the direction of the peripheral indent 44 is formed at the front edge side of the upper face portion 72 of the lid main body portion 71, and an open-close latching body 81 is installed in this indent 80. As shown in FIG. 6, this open-close latching body 81 has a D-shaped ring member 82 and a stud member 84 that couples to this ring member 82 at a head portion 84a with a large diameter on one extremity side. A washer 85 is latched onto the stud member 84 on the rear side of the indent 80 and is rotatably installed on the lid main body portion 71 by the washer 85 and the head portion 84a of the stud member 84. In addition, when the lid 70 is in the above-mentioned closed state, the stud member 84 passes through the insertion hole 53 of the peripheral indent 44 and is held by the catch holding portion 56 on the underneath side.

More specifically, the catch holding portion 56, as also shown in FIG. 4, is comprised of a spring material having a mounting portion 88 that is mounted onto the left front fender portion 31 with screws 55. A retention segment portion 86 is provided that extends out and curves from the mounting portion 88 and is spaced from the lid main body portion 71. A control segment portion 87 can control the deformation of this retention segment portion 86. An insertion hole 100 and an insertion hole 101 shown in FIG. 6, into which the stud member 84 can be inserted, are formed in the mounting portion 88 and the retention segment portion 86. Several projecting portions 102 that project inwardly in the radial direction are formed in the insertion hole 101 of the retention segment portion 86. In accordance with this arrangement, several inclined grooves 103 are formed on the peripheral surface of the stud member 84 in such a way that the more the location is offset in the circumference direction, the more they are inclined towards the tip side in the axial direction. In addition, although an illustration is omitted, the thickness of the tip of the stud member 84 is thickest where the inclined groove 103 is farthest from the tip.

When the stud member 84 is being inserted into the insertion holes 53, 100, 101 between the projecting portions 102 of the insertion hole 53 on the side where the thickness is thin, if it rotated 90 degrees, while the projecting portions 102 are caught inside the inclined groove 103 by the fact that the thickness between the protruding portion 102 becomes thick, the projecting portions 102 are pulled toward the mounting portion 88 side by the inclination of the inclined groove 103 to elastically deform the retention segment portion 86 toward the mounting portion 88 side as shown in FIG. 6. Owing to this elastic deformation, a biasing force is generated on the stud member 84 that is the lid main body 71 in the direction of close contact with the left front fender portion 31. In this state, the lid 70 is in the above-mentioned closed state.

Although an illustration is omitted, the ring member 82 is made to maintain a collapsed state with its own elastic force by offsetting the mounting location on both sides onto the stud member 84. In this state the ring member 82 fits into the inside of the indent 80. Then, by raising up the ring member 82 and by rotating the ring member 82 90 degrees in a direction opposite to that mentioned above, the projecting portions 102 are made to escape from the interior of the inclined grooves 103 to release the catch with the retention segment portion 86. In addition, if the ring member 82 is pulled further, the stud member 84 disengages from the insertion holes 53, 100, 101. In this way, the lid 70 becomes swingable in the direction that opens the storage indent 35.

In addition, as shown in FIG. 3, a ring-shaped sealing member 89 consisting of an elastic material is pasted on the rear surface of the lid main body portion 71, and comes into contact with the dividing wall portion 49 of the peripheral indent 44 throughout its entire periphery when the lid 70 is in the above-mentioned closed state. When the lid 70 is in the closed state, the sealing member 89 is elastically deformed by the height of the dividing wall portion 49 and comes in close contact with the dividing wall portion 49 throughout its entire periphery. In addition, at this time, penetrating holes 50, 51 are placed in the peripheral indent 44, which becomes the outer side of the sealing member 89 with respect to the storage indent 35.

As shown in FIG. 4, on the axial portion 78 of the right side coupling arm portion 76 of the lid 70, a rotating bias spring 91 is installed so as to insert the axial portion 78 into its coil portion 92. This rotating bias spring 91 has a latch arm portion 93 that extends in the radial direction on the outer side at one extremity side being latched onto the latch portion 94 on the rear surface of the inclined plane portion 33 of the left front fender portion 31. In addition, a latch arm portion 95 extends in a radial direction on the outer side at the other extremity side being latched by the latch segment portion 96 of the coupling arm portion 76, to bias the lid 70 in the open direction, which opens the storage indent 35.

According to the structure of a storage section for a saddle-ridden type vehicle 11 of the first embodiment described above, since a storage indent 35 is indented downwardly and is provided on an inclined plane portion 33 of a left front fender 31 and since a lid that opens and closes an opening 41 of this storage indent 35 is also swingably provided, it is possible to prevent the structure from projecting outwardly from the outer surface of the left front fender 31. It is therefore possible to improve the external appearance of the vehicle. Also, since the storage indent 35 that is indented downwardly is provided on an inclined plane part 33 of the left front fender 31, as well as preventing the structure from projecting outwardly, it is also possible to widen the storage space and widen the opening section 41. Therefore, it is possible to ensure adequate storage capacity and storage workability can be improved.

Further, due to the fact that a storage indent 35 is indented downwardly and is formed in the inclined plane portion 33 of the left front fender portion 31, even if, in order to improve storage workability, the lid 70 that opens and closes the aperture 41 of this storage indent 35 is able to have a wide opening so as to be spaced from the storage indent 35 as mentioned above. Thus, storage objects do not drop from the storage indent 35. Therefore, the ability to insert and remove articles from storage, without an article being dropped, that is, the storage workability, can be improved. Furthermore, due to the fact that the storage indent 35 is formed on the inclined plane portion 33, the open area of the aperture 41 becomes larger than the horizontal cross section of the storage indent 35. As a result, the storage workability can be further improved.

In addition, since the storage indent 35 is integrally molded within the front cover 22 that contains the left front fender portion 31, an increase in cost can be reduced at the same time as increase in the number of parts can be reduced.

Furthermore, since at the periphery of the storage indent 35 a peripheral indent 44 that is shallower than the storage indent 35 is formed throughout the entire periphery, the lid 70 in the closed state can be fitted into this peripheral indent 44. Thus, it is possible for the left front fender portion 31 and the lid 70 in the closed state to form one single surface. Therefore, the external appearance is improved. Furthermore, since the sealing member 89 that is installed on the rear surface makes contact with the peripheral indent 44 throughout the entire periphery when the lid 70 is in the closed state, rainwater and the like can be prevented from entering in the interior of the storage indent 35. Therefore, waterproofing of the storage indent 35 can be ensured. Furthermore, since it is possible to bias the lid 70 in the open direction when in the closed state, using the sealing member 89, it is possible to restrict rattling due to play of the lid 70 in the closed state. Therefore, it is possible to prevent abnormal noises from occurring due to rattling of the lid during operation of the vehicle.

In addition, since the dividing wall portion 49 projecting on the upper side along the entire periphery of the border edge on the storage indent 35 side of the peripheral indent 44, it is possible, by the dividing wall portion 49, to ensure that rainwater and the like is prevented from entering the interior of the storage indent 35. Therefore, waterproofing of the storage indent 35 can be ensured. In addition, since if the sealing member 89 of the lid 70 in the closed state is brought into contact with the dividing wall portion 49 as mentioned above, the sealing member 89 can be widely deformed. As a result, the sealing member 89 is brought into close contact with the dividing wall portion 49, making it possible to increase seal effectiveness. Therefore, also from this point, waterproofing of the storage indent 35 can be ensured. Furthermore, the projecting wall portion 73 of the lid 70 in the closed state and the side wall portion 46 of the peripheral indent 44 overlap in the vertical direction, making it possible to ensure waterproofing of the storage indent 35. In addition, since if the sealing member 89 of the lid 70 in the closed state is brought into contact with the dividing wall portion 49, the sealing member 89 can be widely deformed making it possible to strongly bias in the open direction the lid 70 in the closed state with the seal member 89, it is possible to ensure that rattling due to play of the lid 70 in the closed state is restricted. Therefore, it is possible to prevent abnormal noises from occurring due to rattling of the lid 70 during operation of the vehicle.

Furthermore, in order to permit a wide opening of the storage indent 35 by widely swinging the lid 70, coupling arm portions 75, 76 of the lid 70 must be supported by the swinging movement support portions 58, 59 on the rear surface of the left front fender portion 31 through the penetrating holes 50, 51 formed in the peripheral indent 44 more on the outside than the storage indent 35. By forming the penetrating holes 50, 51 at the lower part location of the peripheral indent 44, rainwater that infiltrates in the peripheral indent 44 can be guided with the peripheral indent 44 on the outside of the sealing member 89 and the rainwater can be eliminated satisfactorily through the penetrating holes 50, 51. Therefore, pooling of rainwater in the peripheral indent 44 can be prevented.

In addition, since the lid 70 in the closed state is biased in the open direction with the biasing force of the rotating bias spring 91 from the swinging movement support portion 59 in addition to the biasing force of the sealing member 89 installed on the rear surface of the lid 70, it is possible to ensure that rattling due to play of the lid 70 in the closed state can be restricted. Therefore, it is possible to prevent abnormal noises from occurring due to rattling of the lid 70 during operation of the vehicle. Furthermore, since the open operation of the lid 70 is helped by the biasing force of the rotating bias spring 91, a smooth opening operation is possible.

Furthermore, since the storage indent 35 is installed on the left front fender portion 31, for instance when parked, the occupant in the saddled state while maintaining the right hand brake lever in the held state can open and close the lid 70 satisfactory without forcing only with the left hand to insert and remove and article from storage. In addition, it is obvious that installation is not limited to the left front fender portion 31. The installation can be on the right front fender portion, and also on the rear fender, as required.

Next, a second embodiment of a storage section structure for a saddle-ridden type vehicle of the present invention will be described below with reference to FIG. 7 to FIG. 15, centering on sections that are different from the first embodiment.

In the first embodiment, the storage indent is integrally formed with the front cover 22, but with the second embodiment the main point of difference is that the storage indent 35 is separate from the front cover 22.

Figure 7:
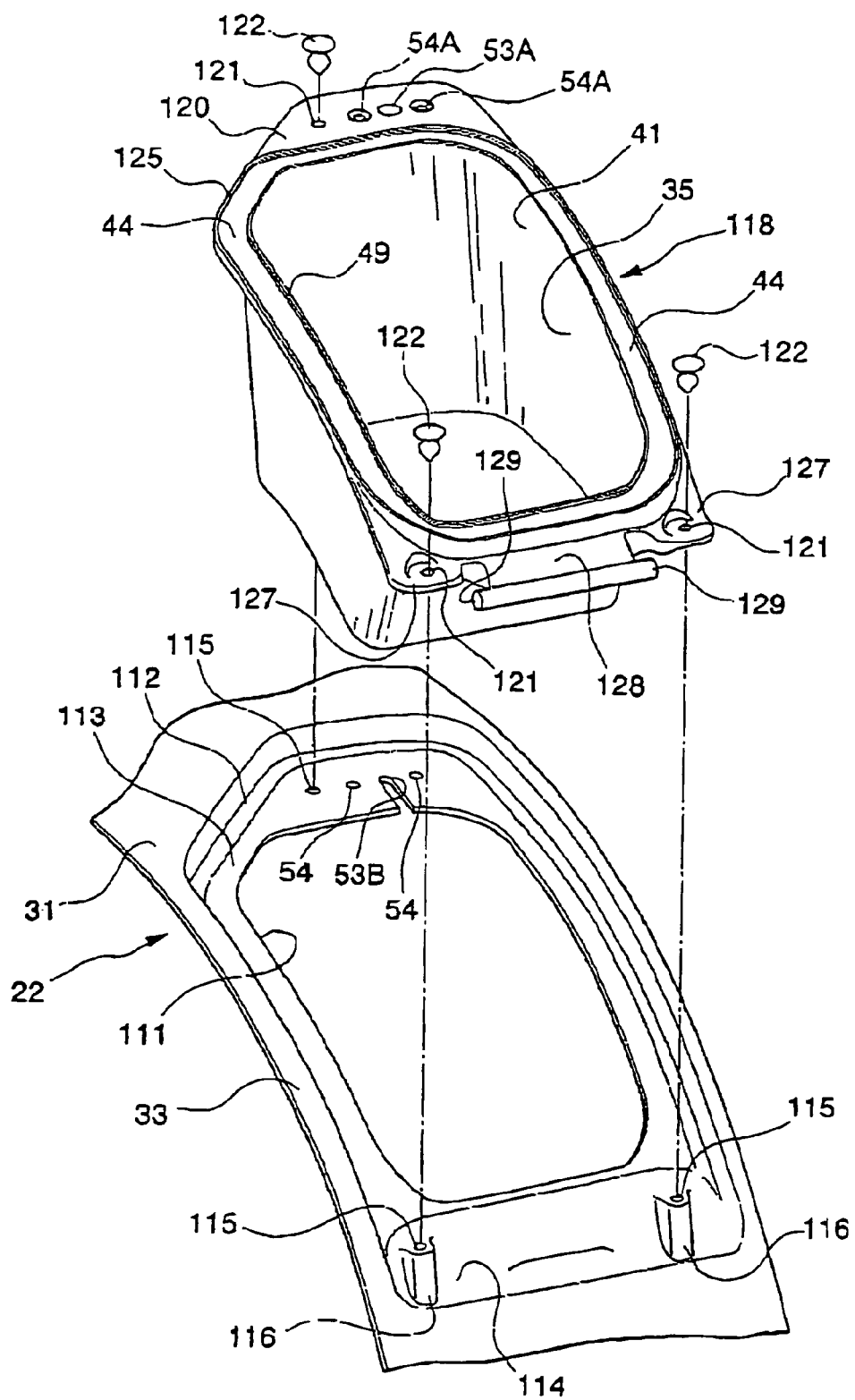
FIG. 7 is a perspective dismantled view of the storage section structure of a saddle-ridden type vehicle according to a second embodiment of the present invention, viewed from the upper side and rear side of the left side of the vehicle body, with the lid removed.

In the second embodiment, as shown in FIG. 7, an insertion hole 111 is formed in the inclined surface section 33 of the left front fender 31 of the front cover, passing through in a vertical direction. The insertion hole 111 is a substantially rectangular shape that is long in the longitudinal direction and with a chamfer formed at a left front side part. An outer side indent 112 is indented downwardly while being curved from the inclined plane portion 33 of the left front fender portion 31 matching the curve of the inclined plane portion 33. An inner side indent 113 is indented further than the outer side indent 112 at an inner side of the outer side indent 112 and is formed at a front side and both left and right sides of the insertion hole 111. Also, a rear side indent 114 that is more deeply indented than the inner side indent 113 is formed at a rear section of the insertion hole 111. The entire periphery of the insertion hole 111 is surrounded by the outer side indent 112, inner side indent 113 and rear side indent 114. Here, attachment seats 116 having attachment holes 115 formed therein are respectively provided that project out on left and right side sections of the rear side indent 114. Attachment holes are also formed in a front part of the inner side indent 113. Attachment holes 54 that are the same as those in the first embodiment are formed in a front part of the inner side section 113. A slit 53B is formed between the attachment holes.

A storage indent 35 is formed in the storage indent body 118 that is separate from the front cover 22. The storage indent body is inserted into the insertion hole 111 and is mounted on the inner side indent 113. The storage indent body 118 has the indent section 35 and a flange section 120 projecting sideways from an edge section of an opening 41 side of this indent section 35. As shown by the state before attachment in FIG. 7 and the state after attachment in FIG. 8, the indent section 35 is fitted into the insertion hole 111, and mounted on the inner indent 113 and the attachment seats 116 at the flange section 120. The storage indent 35 is a substantially rectangular shape that is long in the longitudinal direction and with a chamfer formed at a left front side part, corresponding to the insertion hole 111. Attachment holes 121 are formed in the flange section 120 at both rear sides, and also in the front part, and the storage indent body 118. More specifically, the storage indent 35, is attached to the left front fender 31 by fitting resin clips 22 inserted into these attachment holes 121 into the attachment hole 115.

A dividing wall portion 49 that is the same as that in the first embodiment projects slightly to an upper side and is formed at an inner edge section of the storage indent 35 side stretching completely around. A dividing wall portion 125 that projects slightly upwardly is also formed outside of this dividing wall portion 49 more towards the storage indent 35 than the attachment hole 121. In this way, a surround indent section 44 is indented slightly downwardly so as to completely surround the storage indent 35 and is formed between the dividing wall portion 49 and the dividing wall portion 125. Here, the inner dividing wall portion 49 that projects upwardly is formed so as to project upwardly to the entire periphery of the border edge on the storage indent 35 side of the surround indent section 44. Also, the surround indent section 44 is shallower than the storage indent 35 and is elongated in the longitudinal direction which is the same in plane view as the indent section 35 and is a substantially rectangular shape having a chamfer formed at a left side section.

Attachment holes 54A connecting with the attachment holes 54 of the front cover 22 are formed in a part of the flange section 120 further forward than the surround indent section 44. An insertion hole 53A is formed between the attachment holes 54A.

Figure 9:
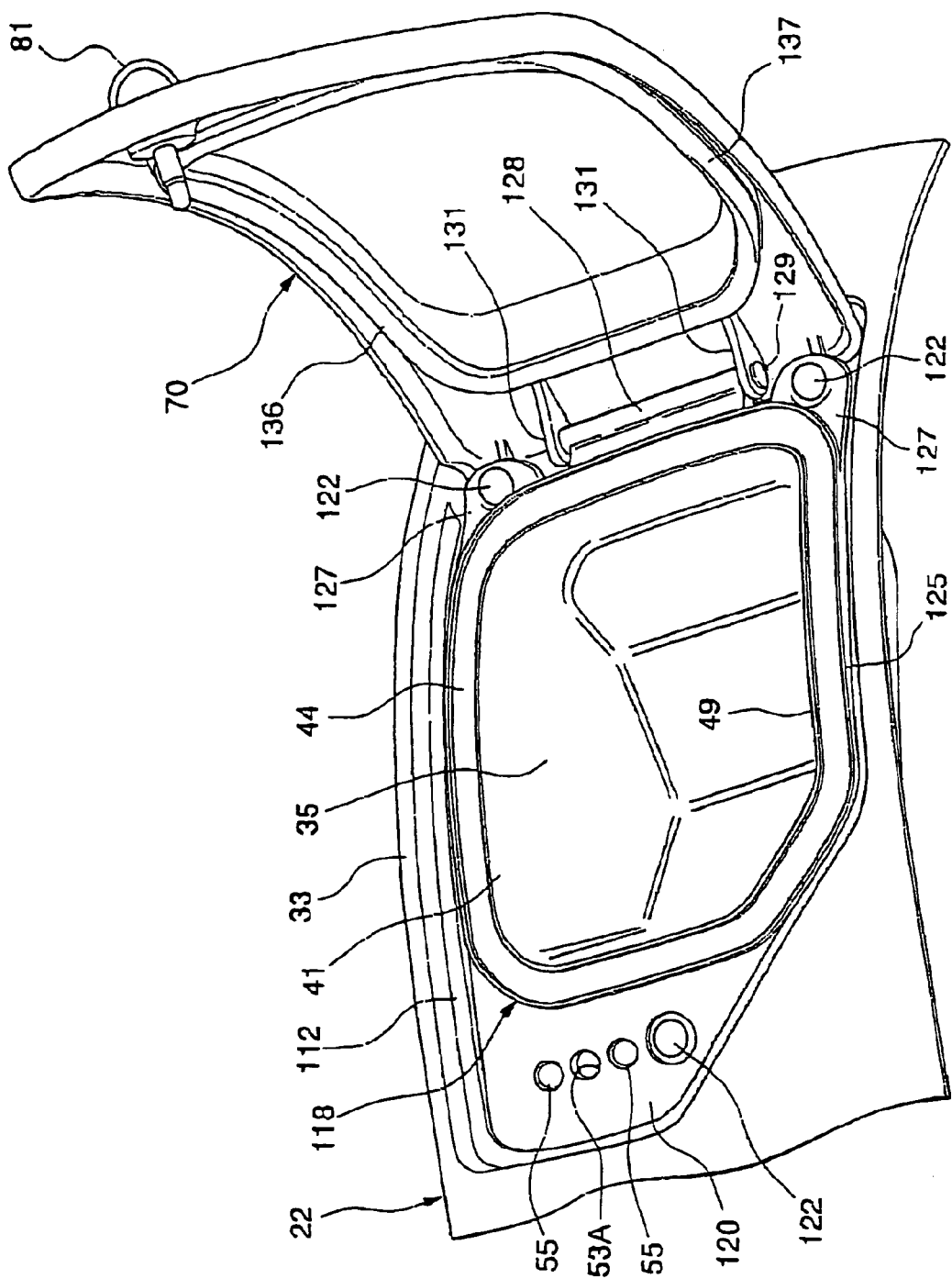
FIG. 9 is a perspective view of the storage section structure of a saddle-ridden type vehicle according to the second embodiment of the present invention viewed from the upper side of the left side of the vehicle body, showing the open state of the lid.
Figure 10:
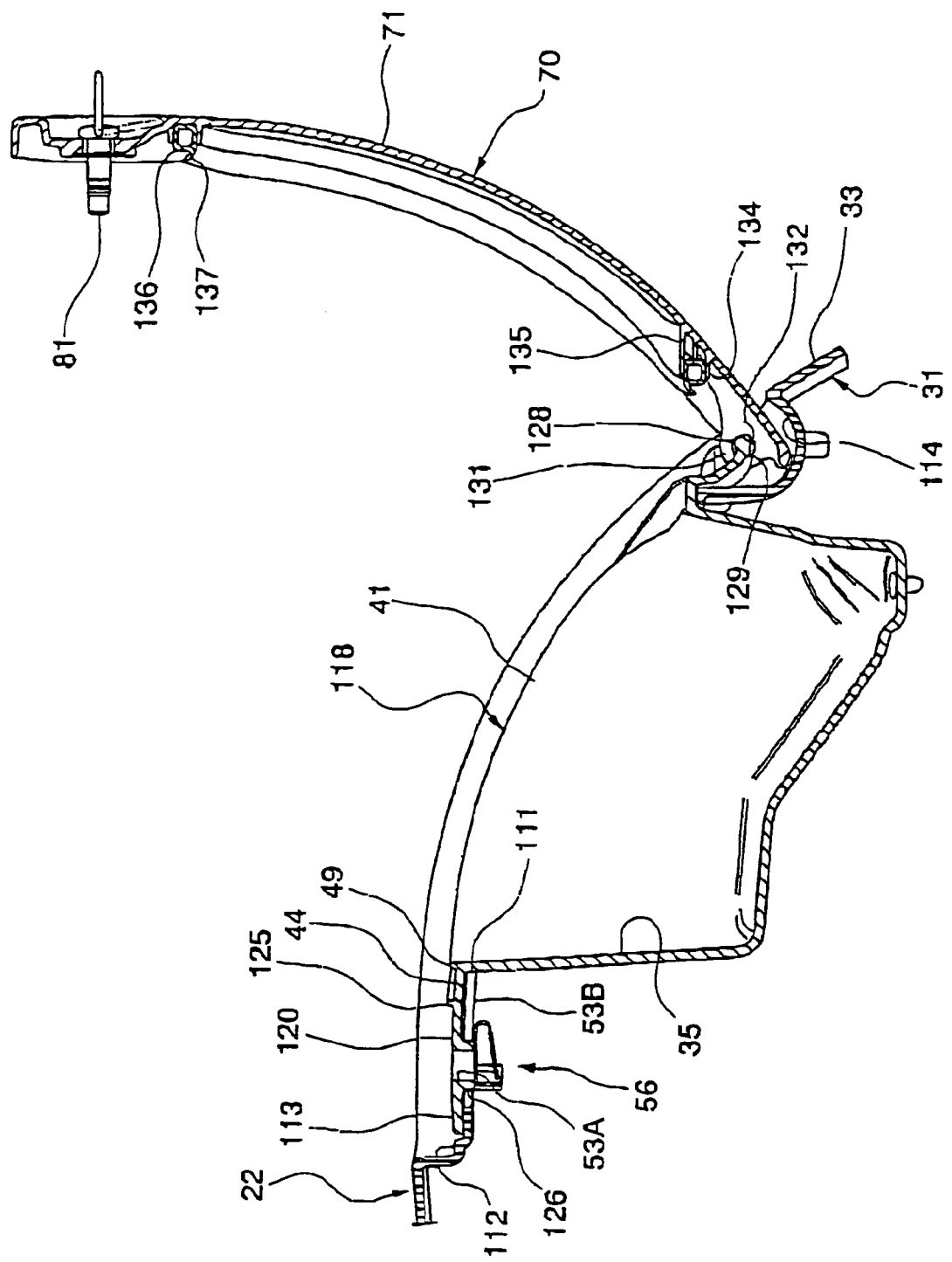
FIG. 10 is a cross sectional view showing the storage section structure of a saddle-ridden type vehicle according to the second embodiment of the present invention, showing the open state of the lid.
Figure 11:
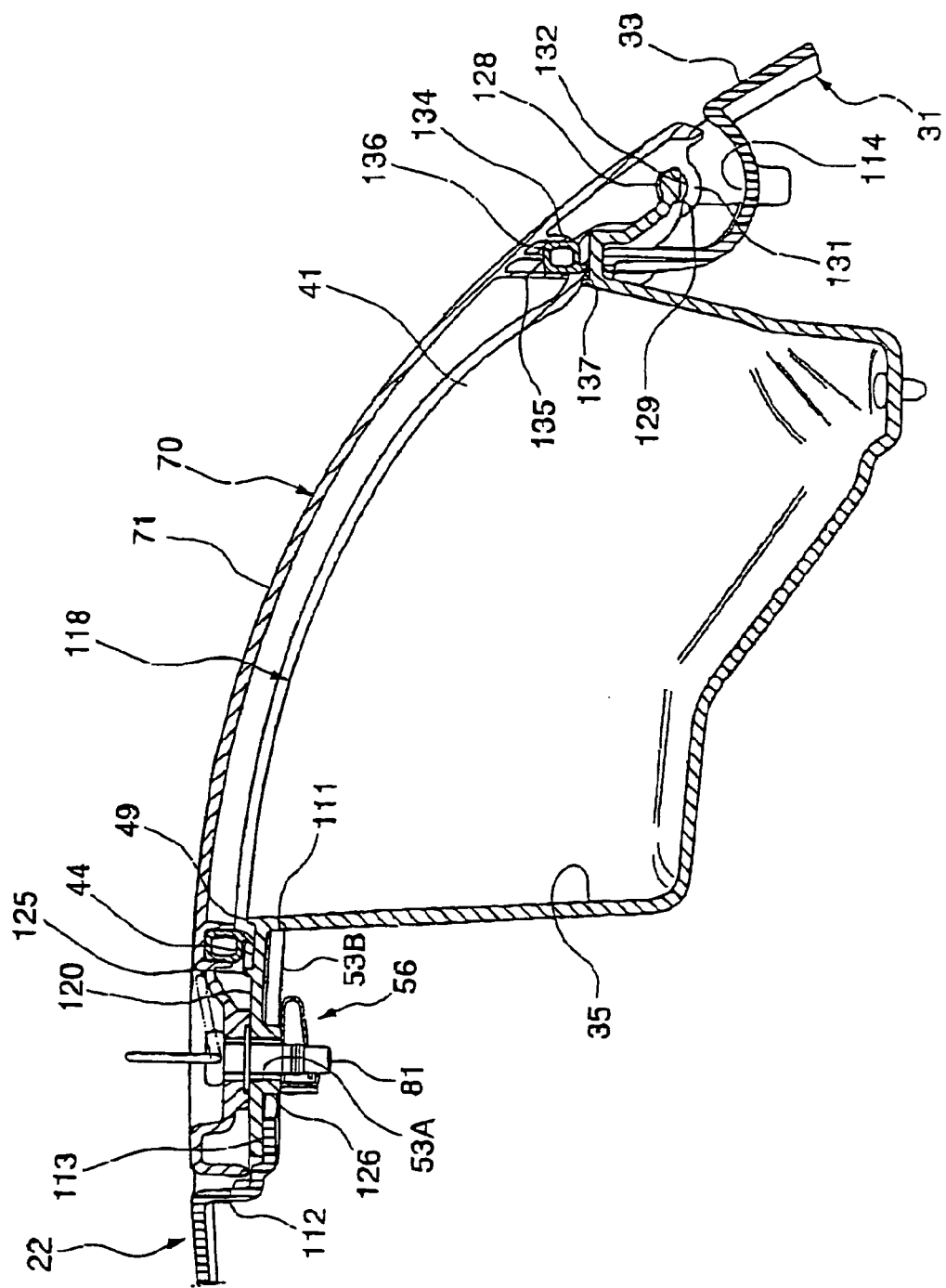
FIG. 11 is a cross sectional view showing the storage section structure of a saddle-ridden type vehicle according to the second embodiment of the present invention, showing the closed state of the lid.
Figure 12:
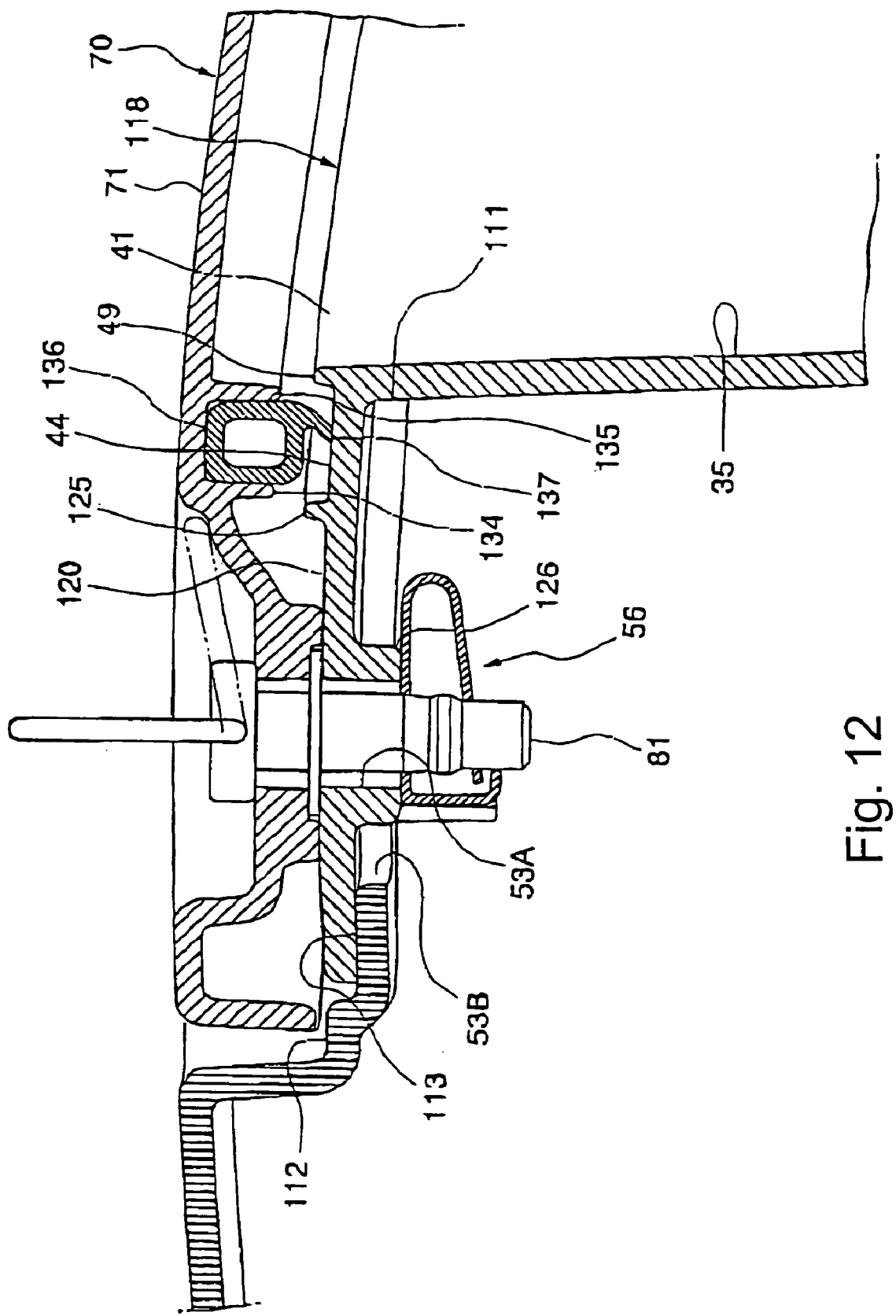
FIG. 12 is an enlarged cross sectional view showing an engagement structure of the storage section structure of a saddle-ridden type vehicle according to the second embodiment of the present invention, showing the closed state of the lid.

On the rear side of the flange section 120 a catch holding portion 56, that is the same as the first embodiment, is shown in FIG. 10 to FIG. 12 and is attached using screws 55 shown in FIG. 9, which are inserted through the attachment holes 54A and the attachment holes 54. The insertion hole 53A is formed in a boss section 126 projecting downwardly. This boss section 126 is fitted into the slit 53B of the front cover 22.

Figure 8:
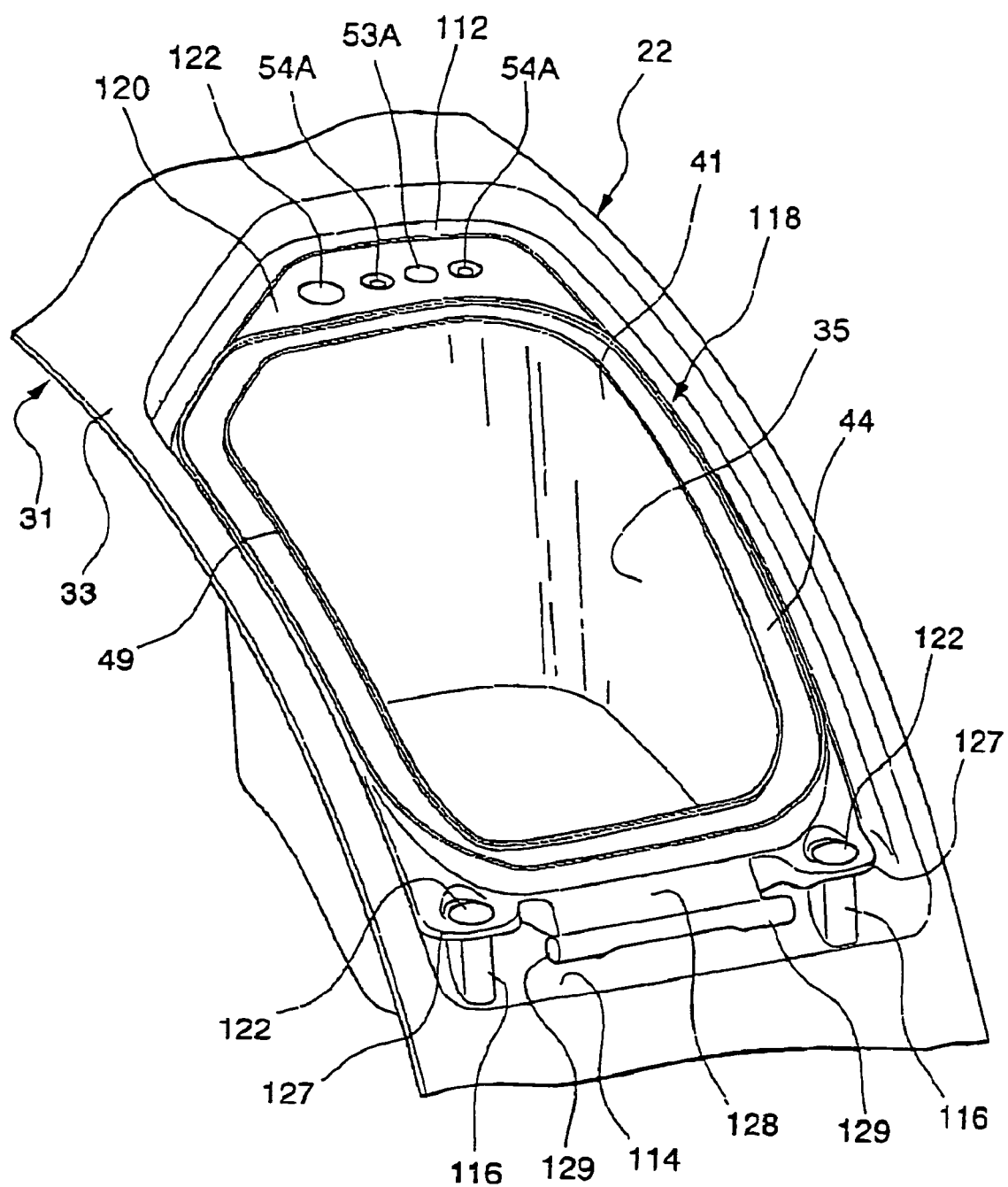
FIG. 8 is a perspective view of the storage section structure of a saddle-ridden type vehicle according to a second embodiment of the present invention, viewed from the upper side and rear side of the left side of the vehicle body, with the lid removed.

Also, as shown in FIGS. 7 and 8, a rear section of the flange section 120 of the indent body 118 is made into attachment hole formation sections 127 having attachment holes 121 formed therein and mounted on the attachment seat 116 via fasteners 122. A support section 128 is formed at a position between the attachment hole formation sections 127 and extends outwardly to a point further than the attachment hole formation sections 127 for defining gaps between itself and the attachment hole formation sections 127. A support shaft 129 is formed on left and right sides of the rear end of the support section 128, so as to project outwardly to the left and right. The indent body 118 above is integrally formed of resin.

As described above, by attaching the indent body 118 to the left front fender 31, the storage indent 35 is provided so as to be indented downwardly to an inclined surface 33 of the left front fender 31. Then, as shown in FIGS. 2 and 3, a lid 70 that opens and closes the aperture 41 on the upper part of the storage indent 35 is swingably coupled to the left front fender portion 31.

Figure 13:
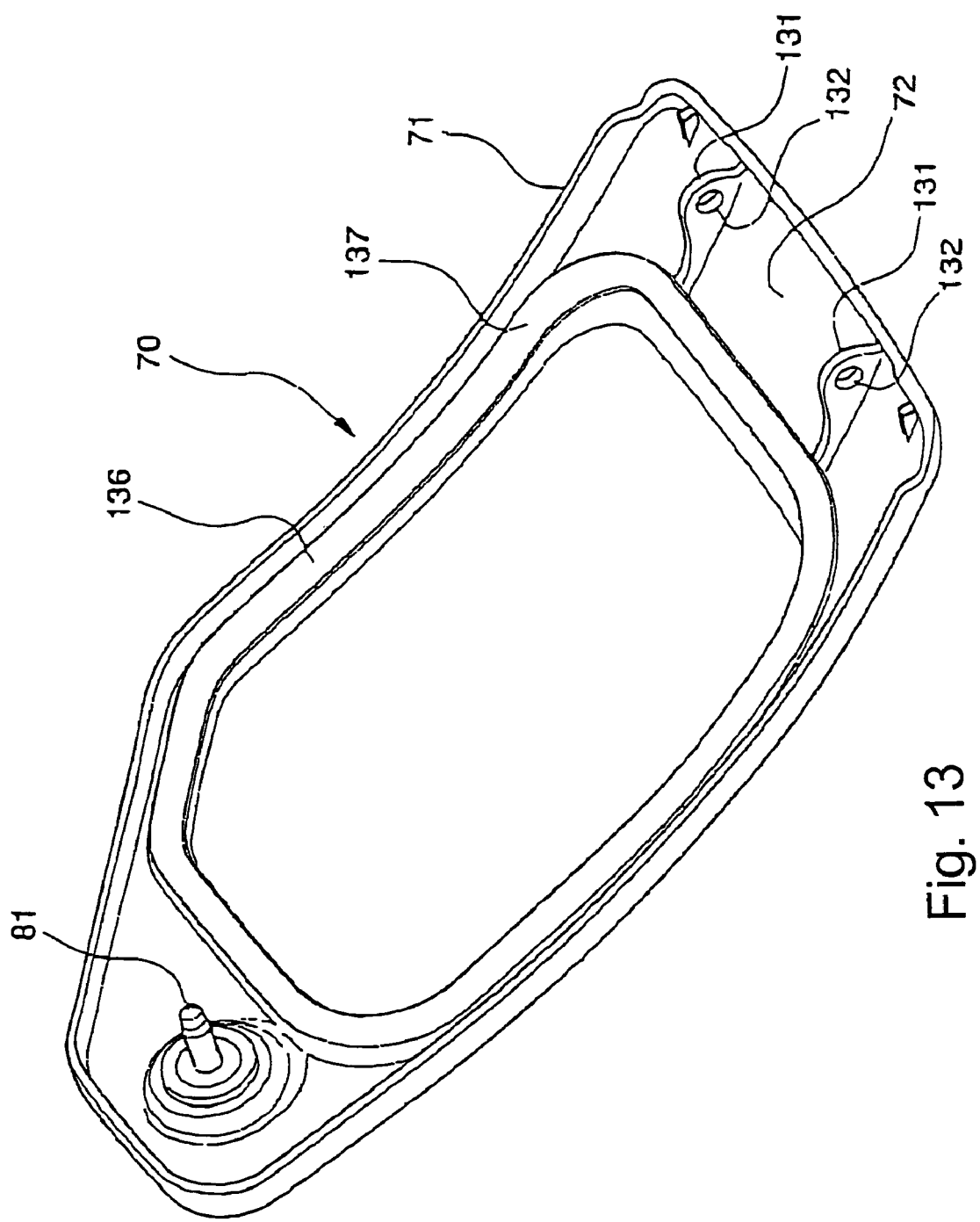
FIG. 13 is a rear surface side perspective view showing lid of the storage section structure of a saddle-ridden type vehicle according to a second embodiment of the present invention.
Figure 14:
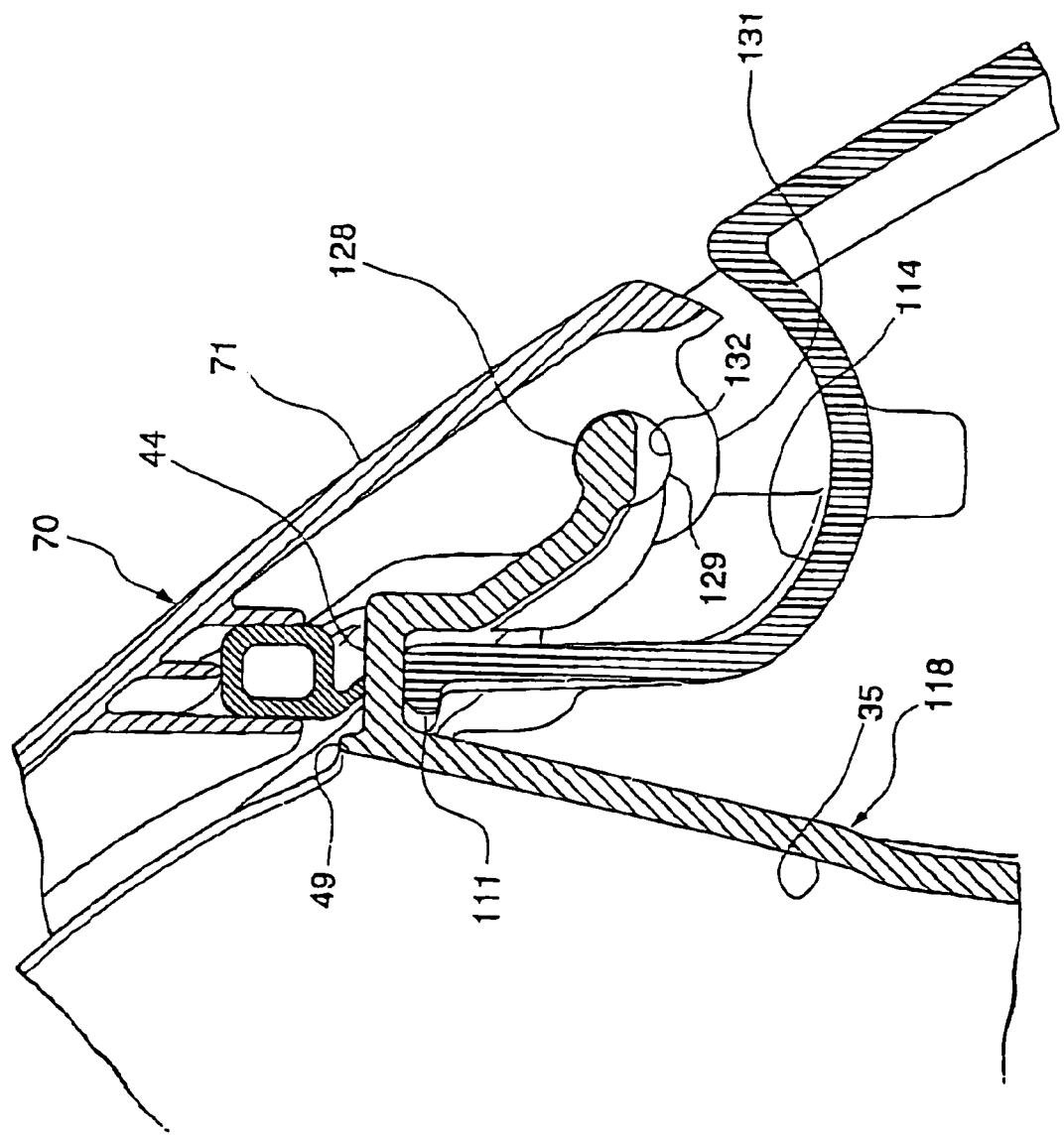
FIG. 14 is an enlarged cross sectional view showing a support structure of the storage section structure of a saddle-ridden type vehicle according to the second embodiment of the present invention, showing the closed state of the lid.

As shown in FIG. 13, two lid connection parts 131 are formed in the lid 70 projecting slightly from the rear surface of the upper surface part 72 of the lid body 71. Connection holes 132 are coaxial arranged with respect to each other and are respectively formed in each lid connection part 131. As shown in FIG. 9, with the support section 128 for the storage indent body arranged between the lid connection parts 131, the support shaft 129 is clipped into the connection holes 132, as shown in FIGS. 10, 11 and 14, to hold the lid 70 so as to be swingable about the support shaft 129 on the left front fender 31 with the support indent body 118 attached.

Figure 15:
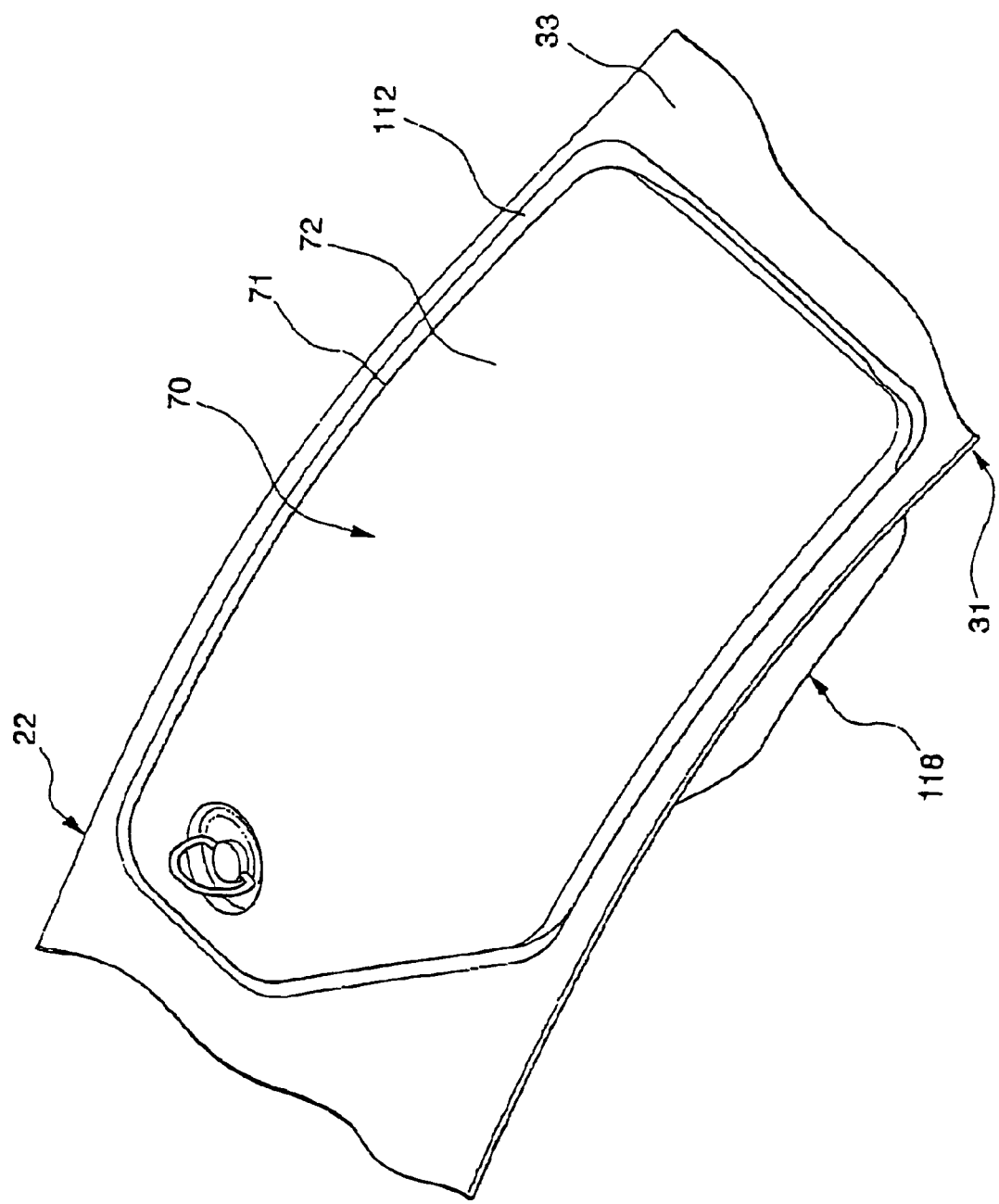
FIG. 15 is a perspective view of the storage section structure of a saddle-ridden type vehicle according to a second embodiment of the present invention, viewed from the upper side and rear side of the left side of the vehicle body, showing the closed state of the lid.

The lid 70 supported in the storage indent body 118 of the left front fender at the lid connection parts 131, as described above, is then swung between a state where the storage indent 35 is fitted into the outer side indent 112 and closed, as shown in FIGS. 11 and 15, and a state where it is swung upwards as shown in FIGS. 9 and 10 further back than the storage indent 35 so as to be open.

Here, as with the first embodiment, an open-close latching body 81, that is the same as the first embodiment, is provided that engages with the catch holding portion 56, as shown in FIGS. 11 and 12. The open-close latching body 81 is formed at the front edge side of the upper face portion 72 of the lid main body portion 71.

Also, a supporting wall section 134 projecting to form a ring, and a supporting wall section 135 projecting so as to form a ring at an inner side of this supporting wall section 134 are formed on a rear surface of the lid body 71. In addition, a ring-shaped seal member 136 is fitted between the supporting wall sections 134 and 135. A seal member 136 is provided that projects in a direction apart from the rear surface of the lid body 71 while widening from an inner edge to the outside. The seal member 136 is formed all the way around. If the lid 70 is closed the seal member 136 comes into contact with the seal member 137 all around the surround indent section 44 and seals the storage indent 35 to the outside.

As has been described above, according to the storage structure for a saddle ridden type vehicle of the second embodiment, the same effects as for the first embodiment are achieved. Also, since a support section 128 for pivoting the lid 70 is provided in the storage indent body 118 having the storage indent 35 formed separately from the left front fender 31, it is possible to make the structure compact compared to the case where the lid 70 is pivoted at the left front fender 31 side. It is also easy to take out the position of the storage indent 35 and the support section 128.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure of a storage section for a saddle-ridden type vehicle comprising:
    a storage indent indented downwardly from an opening and provided on an inclined plane portion of a fender that covers a wheel;
    a lid that opens and closes the opening of the storage indent and is swingably provided on the inclined plane portion of the fender;
    a peripheral indent that is shallower than said storage indent and formed throughout an entire periphery of the opening of the storage indent;
    a dividing wall portion projecting to an upper side and formed throughout an entire periphery of a border edge on the storage indent side of the peripheral indent; and
    an opening and closing mechanism disposed in the peripheral indent and on an inner side of an outer peripheral edge of the lid.

2. The structure of a storage section for a saddle-ridden type vehicle as disclosed in claim 1, wherein the storage indent is integrally molded with the fender.

3. The structure of a storage section for a saddle-ridden type vehicle as disclosed in claim 1, wherein a sealing member is installed on the rear surface of the lid making contact with the peripheral indent throughout the entire periphery in a closed state.

4. The structure of a storage section for a saddle-ridden type vehicle as disclosed in claim 2, wherein a sealing member is installed on the rear surface of the lid making contact with the peripheral indent throughout the entire periphery in a closed state.

5. The structure of a storage section for a saddle-ridden type vehicle as disclosed in claim 1, wherein a storage indent body having the storage indent is separate from the fender, with the storage indent body being provided on the fender and provided with a support section for pivoting the lid.

6. The structure of a storage section for a saddle-ridden type vehicle as disclosed in claim 3, wherein a coupling arm that extends out from the rear side of the lid passes through a penetrating hole formed at a lower part of the peripheral indent and is rotatably coupled to a swinging movement support portion on the rear side of the fender.

7. The structure of a storage section for a saddle-ridden type vehicle as disclosed in claim 3, wherein a coupling arm that extends out from the rear side of the lid passes through a penetrating hole formed at a lower part of the peripheral indent and is rotatably coupled to a swinging movement support portion on the rear side of the fender.

8. The structure of a storage section for saddle-ridden type vehicle according to claim 6, wherein a spring that biases the lid in the open direction is installed on the swinging movement support portion.

9. The structure of a storage section for saddle-ridden type vehicle according to claim 7, wherein a spring that biases the lid in the open direction is installed on the swinging movement support portion.

10. The structure of a storage section for a saddle-ridden type vehicle according to claim 1, wherein the wheel is the left front wheel.

11. A structure of a storage section for a saddle-ridden type vehicle comprising:
    a storage container that is inclined to conform to contours of a fender for covering a wheel;
    an indent indented downwardly from an opening in the fender, said indent being configured to receive the storage container and to conform to the inclined shape of the storage container and being received within the fender for covering a wheel; and
    a lid for opening and closing the opening, said lid being swingably mounted on the inclined plane portion of the fender;
    a peripheral indent that is shallower than said indent and formed throughout an entire periphery of the opening; and
    an opening and closing mechanism disposed in the peripheral indent and inner side of an outer peripheral edge of the lid;
    a first dividing wall portion projecting to an upper side and formed throughout an entire periphery of an inner edge section of the indent;
    a second dividing wall portion projecting to the upper side, formed outside the first dividing wall portion and inside of the opening and closing mechanism, and
    a surround indent section formed between the first dividing wall portion and the second dividing wall portion and indented downwards so as to completely surround the indent.

12. The structure of a storage section for a saddle-ridden type vehicle as disclosed in claim 11, wherein the storage container is integrally molded with the fender.

13. The structure of a storage section for a saddle-ridden type vehicle as disclosed in claim 11, wherein a sealing member is installed on the rear surface of the lid making contact with the peripheral indent throughout the entire periphery in a closed state.

14. The structure of a storage section for a saddle-ridden type vehicle as disclosed in claim 12, wherein a sealing member is installed on the rear surface of the lid making contact with the peripheral indent throughout the entire periphery in a closed state.

15. The structure of a storage section for a saddle-ridden type vehicle as disclosed in claim 11, wherein a storage container is separate from the fender, with the storage container being provided on the fender and provided with a support section for pivoting the lid.

16. The structure of a storage section for a saddle-ridden type vehicle as disclosed in claim 14, wherein a coupling arm portion that extends out from the rear side of the lid passes through a penetrating hole formed at a lower part of the peripheral indent and is rotatably coupled to a swinging movement support portion on the rear side of the fender.

17. A structure of a storage section for a saddle-ridden type vehicle comprising:
   a storage indent that is indented downwardly on one of fenders, the fenders being respectively provided for all wheels of the vehicle so as to respectively cover the wheels, the one of fenders having an upper face portion and an inclined plane portion, the upper face portion covering an upper portion of one of the wheels approximately horizontally, and the inclined plane portion being inclined so as to be curved along a back upper part of the one of the wheels, the storage indent being provided on the inclined plane; and
   a lid that opens and closes an opening of the storage indent and is swingably provided on the inclined plane portion of the fender;
   a peripheral indent that is shallower than said storage indent and formed throughout an entire periphery of the opening of the storage indent;
   a dividing wall portion projecting to an upper side and formed throughout an entire periphery of a border edge on the storage indent side of the peripheral indent; and
   an opening and closing mechanism disposed in the peripheral indent and inner side of an outer peripheral edge of the lid,
   wherein the lid opens rearwardly in a longitudinal direction of the vehicle.

18. The structure of a storage section for a saddle-ridden type vehicle according to claim 17, wherein the storage indent is applied on one of front fender portions.

19. A structure of a storage section for a saddle-ridden type vehicle comprising:
   a storage container that is inclined to conform to a contours of one of fenders, the fenders being respectively provided for all wheels of the vehicle so as to respectively cover the wheels, the one of fenders having an upper face portion and an inclined plane portion, the upper face portion covering an upper portion of one of the wheels approximately horizontally, and the inclined plane portion being inclined so as to be curved along a back upper part of the one of the wheels;
   an indent that is indented downwardly in the one of fenders, said indent being configured to receive the storage container and to conform to the inclined shape of the storage container and being received within the one of fenders;
   a lid for opening and closing an opening in the storage container, said lid being swingably mounted on the inclined plane portion;
   a peripheral indent that is shallower than said indent and formed throughout an entire periphery of the opening; and
   an opening and closing mechanism disposed in the peripheral indent and inner side of an outer peripheral edge of the lid,
   wherein the opening is directed rearwardly in a longitudinal direction of the vehicle;
   a first dividing wall portion projecting to an upper side and formed throughout an entire periphery of an inner edge section of the indent;
   a second dividing wall portion projecting to the upper side, formed outside the first dividing wall portion and inside of the opening and closing mechanism, and
   a surround indent section formed between the first dividing wall portion and the second dividing wall portion and indented downwards so as to completely surround the indent.

20. The structure of a storage section for a saddle-ridden type vehicle according to claim 19, wherein the storage indent is applied on one of front fender portions.

21. The structure of a storage section for a saddle-ridden type vehicle according to claim 17, wherein the storage indent has a bottom surface portion that is inclined so that a back portion is located lower than a front portion.

22. The structure of a storage section for a saddle-ridden type vehicle according to claim 17, wherein the storage indent adopts an approximately rectangular shape and has a chamfer formed on a left side front portion.

23. The structure of a storage section for a saddle-ridden type vehicle according to claim 17, wherein the lid is mounted via a pair of J-shaped coupling arms on the inclined plane portion, and the coupling arms extend out from a rear side of the lid and pass through penetrating holes formed on a peripheral indent portion of the one of fenders.

24. The structure of a storage section for a saddle-ridden type vehicle according to claim 19, wherein the storage container has a bottom surface portion that is inclined so that a back portion is located lower than a front portion.

25. The structure of a storage section for a saddle-ridden type vehicle according to claim 19, wherein the storage container adopts an approximately rectangular shape and has a chamfer formed on a left side front portion.

26. The structure of a storage section for a saddle-ridden type vehicle according to claim 19, wherein the lid is mounted via a pair of J-shaped coupling arms on the inclined plane portion, and the coupling arms extend out from a rear side of the lid an pass through penetrating holes formed on a peripheral indent portion of the one of fenders.

27. The structure of a storage section for a saddle-ridden type vehicle according to claim 1, wherein the storage indent has a bottom surface portion that is inclined so that a back portion is located lower than a front portion, and the storage indent adopts an approximately rectangular shape.

28. The structure of a storage section for a saddle-ridden type vehicle according to claim 1, wherein the storage indent has a chamfer formed on an outer side in a vehicle width direction.

29. The structure of a storage section for a saddle-ridden type vehicle according to claim 1, wherein the indent has a bottom surface portion that is inclined so that a back portion is located lower than a front portion, and the indent adopts an approximately rectangular shape.

30. The structure of a storage section for a saddle-ridden type vehicle according to claim 1, wherein the indent has a chamfer formed on an outer side in a vehicle width direction.

31. The structure of a storage section for a saddle-ridden type vehicle according to claim 1, wherein the opening and closing mechanism comprises a support section for swingably supporting the lid on a lower side and a latching body,
   wherein one of the support section and the latching body is provided on a front side of the opening, and
   the other of the support section and the latching body is provided on a rear side of the opening.

32. The structure of a storage section for a saddle-ridden type vehicle according to claim 1, wherein the opening and closing mechanism comprises a support section for swingably supporting the lid on a lower side and a latching body,
   wherein the support section is provided on a lower side of the opening, and the lid is capable of being fitted into the peripheral indent so as to close the opening.

33. The structure of a storage section for a saddle-ridden type vehicle according to claim 11, wherein the opening and closing mechanism comprises a support section for swingable supporting the lid on a lower side and a latching body, wherein one of the support section and the latching body is provided on a front side of the opening, and the other of the support section and the latching body is provided on a rear side of the opening.

34. The structure of a storage section for a saddle-ridden type vehicle according to claim 11, wherein the opening and closing mechanism comprises a support section for swingably supporting the lid on a lower side and a latching body, wherein the support section is provided on a lower side of the opening, and the lid is capable of being fitted into the peripheral indent so as to close the opening.

35. The structure of a storage section for a saddle-ridden type vehicle according to claim 11, wherein the lid has a latching body and a lid connection part for securing the lid storage container, the latching body being disposed through a hole in the indent and forward of a front wall of the storage container, and the lid connection part being disposed above a rear side indent and rearward of a rear outer wall of the storage container.

36. The structure of a storage section for a saddle-ridden type vehicle according to claim 17, wherein the opening and closing mechanism comprises a support section for swingably supporting the lid on a lower side and a latching body, wherein one of the support section and the latching body is provided on a front side of the opening, and the other of the support section and the latching body is provided on a rear side of the opening.

37. The structure of a storage section for a saddle-ridden type vehicle according to claim 17, wherein the opening and closing mechanism comprises a support section for swingably supporting the lid on a lower side and a latching body, wherein the support section is provided on a lower side of the opening, and the lid is capable of being fitted into the peripheral indent so as to close the opening.

38. The structure of a storage section for a saddle-ridden type vehicle according to claim 19, wherein the opening and closing mechanism comprises a support section for swingably supporting the lid on a lower side and a latching body, wherein one of the support section and the latching body is provided on a front side of the opening, and the other of the support section and the latching body is provided on a rear side of the opening.

39. The structure of a storage section for a saddle-ridden type vehicle according to claim 19, wherein the opening and closing mechanism comprises a support section for swingably supporting the lid on a lower side and a latching body, wherein the support section is provided on a lower side of the opening, and the lid is capable of being fitted into the peripheral indent so as to close the opening.

40. The structure of a storage section for a saddle-ridden type vehicle according to claim 19, wherein the lid has a latching body and a lid connection part for securing the lid storage container, the latching body being disposed through a hole in the indent and forward of a front wall of the storage container, and the lid connection part being disposed above a rear side indent and rearward of a rear outer wall of the storage container.

41. A structure of a storage section for a saddle-ridden type vehicle comprising:

a storage indent indented downwardly from an opening and provided on an inclined plane portion of a fender that covers a wheel;

a lid that opens and closes the opening of the storage indent and is swingably provided on the inclined plane portion of the fender;

a peripheral indent that is shallower than said storage indent and formed at a periphery of the opening of the storage indent;

an opening and closing mechanism disposed in the peripheral indent and inner side of an outer peripheral edge of the lid;

a first dividing wall portion projecting to an upper side and formed throughout an entire periphery of an inner edge section of the storage indent;

a second dividing wall portion projecting to an upper side, formed outside of the first dividing wall portion and inside of the opening and closing mechanism; and a surround indent section formed between the first dividing wall portion and the second dividing wall portion and indented downwards so as to completely surround the storage indent.

42. The structure of a storage section for a saddle-ridden type vehicle according to claim 1, wherein the dividing wall portion is formed continuously with a side wall portion of the storage indent.

43. The structure of a storage section for a saddle-ridden type vehicle according to claim 17, wherein the dividing wall portion is formed continuously with a side wall portion of the storage indent.

* * * * *